Nov. 25, 1924.  
E. H. JOHNSON  
EXTRUDING MACHINE  
Filed Jan. 5, 1922
1,516,968
2 Sheets-Sheet 1
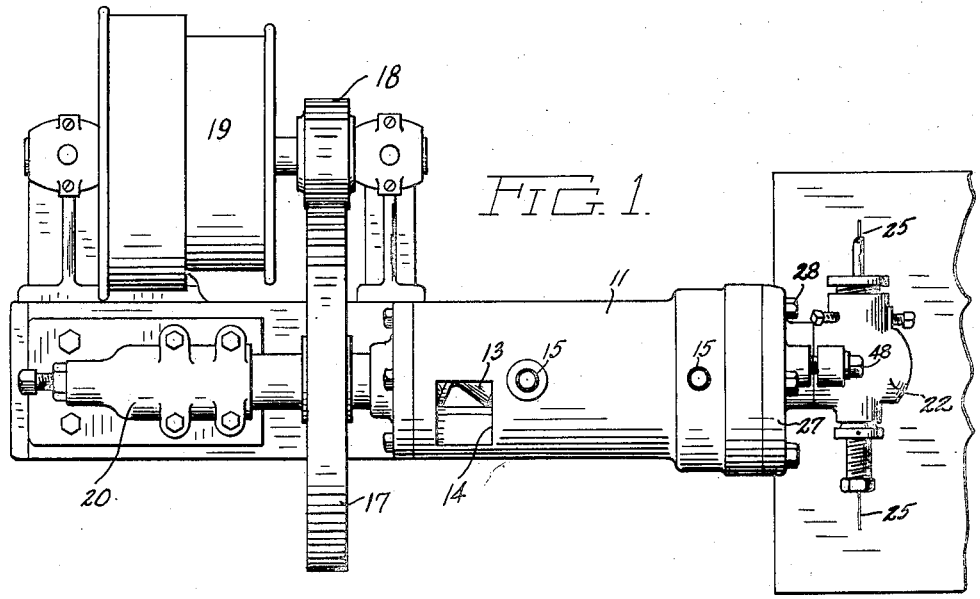
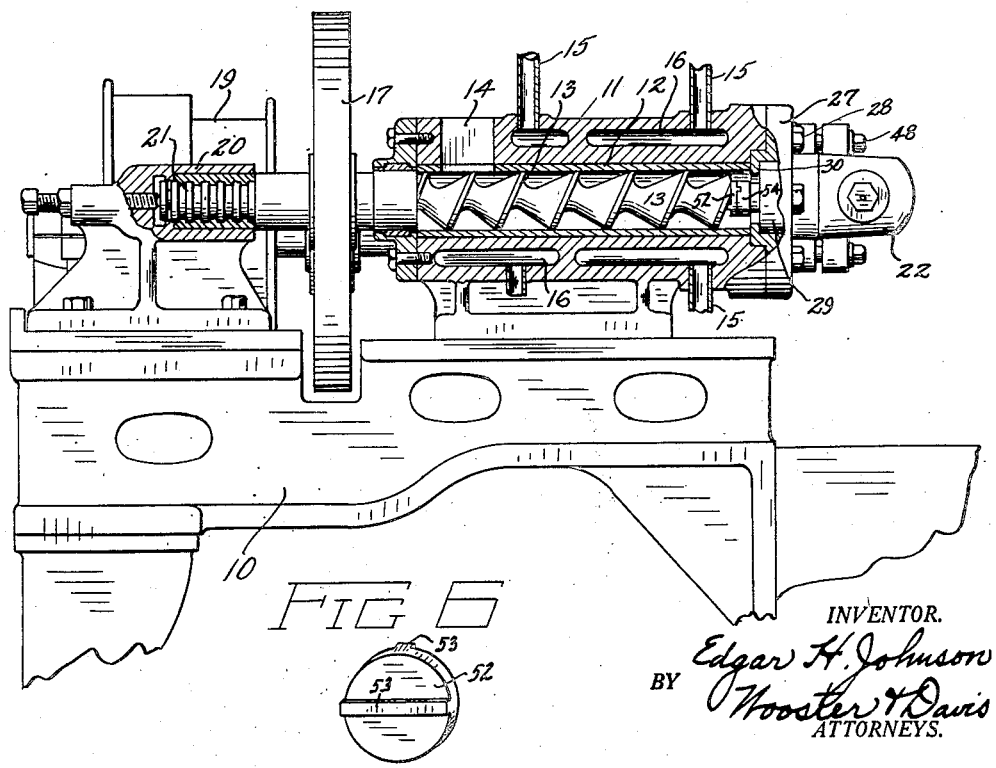
INVENTOR.  
Edgar H. Johnson  
BY Wooster & Davis  
ATTORNEYS.

Nov. 25, 1924.
E. H. JOHNSON
EXTRUDING MACHINE
Filed Jan. 5, 1922
1,516,968
2 Sheets-Sheet 2
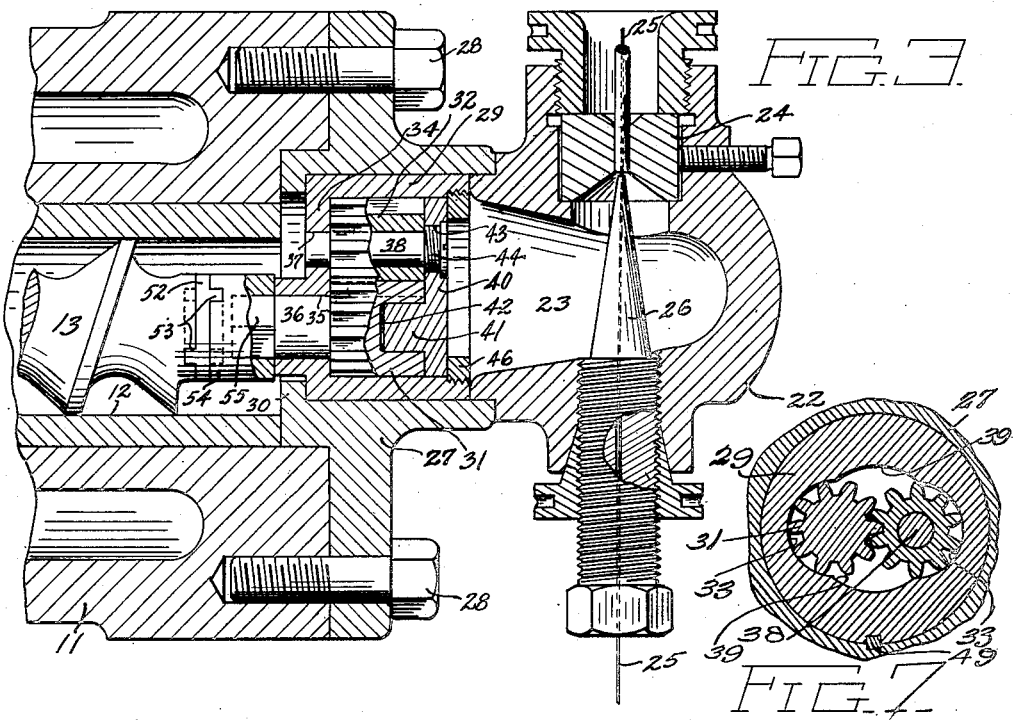
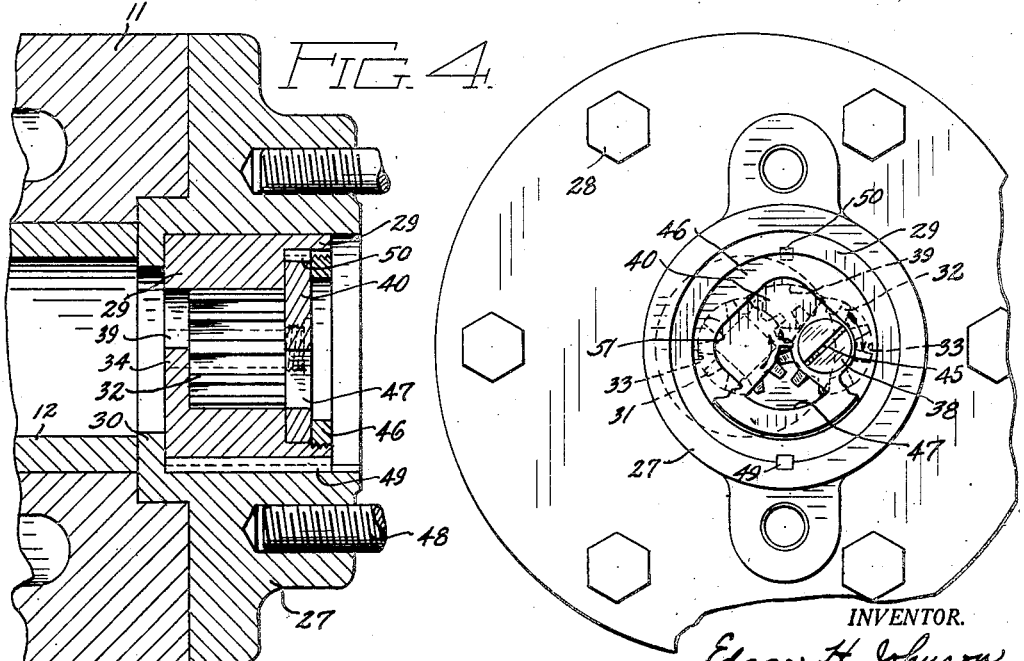
INVENTOR.
Edgar H. Johnson
BY Wooster & Davis
ATTORNEYS.

Patented Nov. 25, 1924.

1,516,968

UNITED STATES PATENT OFFICE.

EDGAR H. JOHNSON, OF STAMFORD, CONNECTICUT.

EXTRUDING MACHINE.

Application filed January 5, 1922. Serial No. 527,198.

*To all whom it may concern:*

Be it known that I, EDGAR H. JOHNSON, a citizen of the United States, residing at Stamford, county of Fairfield, State of Connecticut, have invented an Improvement in Extruding Machines, of which the following is a specification.

This invention relates to extruding machines and has for an object to provide improved means for feeding and increasing the pressure on the plastic material so that it will be properly extruded through the die.

I have illustrated my invention as applied to a wire covering machine of a type now in general use and when so applied will greatly increase the output thereof, but I wish it to be distinctly understood that this device is not limited to use with wire covering machines as it will be obvious it may be used in other types of devices where it is required that plastic material be fed or forced under high pressure, such as machines for extruding tubes, straining plastic compounds, and so forth.

It is a further object of the invention to provide a device of this character which is simple in construction and so is not liable to be easily gotten out of order and which will operate indefinitely without attention.

In wire covering machines, or the like, now generally in use where some suitable plastic material, such as a rubber composition is extruded through a die onto the wires as it passes through the die, or through dies to form a tube, or through a strainer, or the like, a worm or screw feed is generally employed to feed the plastic material to the extruding chamber of the die, and to produce the pressure thereon which extrudes the material through the die. With this type of feed, the pressure on the plastic material in the die cannot be made to exceed a certain amount, as above this point it will rotate with the screw or worm and will not be fed forwardly, so that the output from this type of machine is very limited. This is especially true where the plastic material used is quite soft, as it should be to extrude properly. In fact, under these conditions, it is difficult to obtain sufficient pressure on the material in the die to extrude the same. I overcome these difficulties and greatly increase the output of the machine by placing between the ordinary worm or screw feed and the extruding die, a positively acting feeding device having practically no slippage, even when feeding a comparatively soft material. For this purpose, I have found that a pair of rotating elements having intermeshing projections similar to the teeth of gears work perfectly and increase the pressure on the covering material in the extruding die to such an extent, and feed this material to the die in such quantities, as to greatly increase the output of the machine.

With the foregoing and other objects in view I have devised a device embodying my invention illustrated in the accompanying drawings, in which—

Fig. 1 is a plan view of a wire covering machine showing my improvement applied thereto.

Fig. 2 is a front elevation thereof, portions of the machine being broken away to illustrate the interior construction.

Fig. 3 is a horizontal section through the insulating head and feeding mechanism therefor.

Fig. 4 is a vertical section through a portion of the feeding mechanism.

Fig. 5 is an end view looking from the right of Fig. 4.

Fig. 6 is a perspective view of one element of the driving connection between the screw conveyor and the feeding device, and Fig. 7 is a transverse section through the gear elements and their enclosing casing.

The covering mechanism illustrated, to which I have shown my device applied, is of an old type of wire covering machine and is used merely to illustrate the use of my invention. It is shown as mounted on a suitable support, as a stand 10, and comprises a cored cylinder 11 having a cylindrical bore lined by means of a tube 12 in which is mounted a screw conveyor 13, with a feeding opening 14 leading to this conveyor at one end thereof and with suitable piping 15 leading to the chambers 16 in the walls of the cylinder for conducting cooling or heating fluid, such as water or steam, to this chamber for cooling or heating the plastic material conveyed through the cylinder by the conveyor to maintain it at the proper consistency for extruding. Suitable means is provided for rotating the conveyor, in the embodiment shown a spur gear 17 connected with the conveyor and driven by a pinion 18 which is in turn driven by the cone pulley 19 from any suitable source of power. Longitudinal movement of the screw conveyor, under the thrust caused by feeding plastic material, is prevented by means for a suitable thrust head 20 having a thrust bearing 21 for the shaft and may be located on either side of the spur gear 17.

The insulating head 22, in the wire covering machines now generally used, is connected directly to the end of cylinder 11 so that the plastic covering material is fed from the screw conveyor directly to the chamber 23 in this head and, therefore, the pressure imparted to the plastic covering by the rotating screw conveyor is relied upon to extrude the covering material through the die 24 about the wire 25 which is led to the opening in this die by the cone-shaped guide 26. The pressure which may be imparted to the plastic material by the screw conveyor is limited because, beyond a certain point, it will rotate with the conveyor without any forward movement. Especially is this true when the material is comparatively soft. This limits the output of the machine and renders it comparatively slow in operation.

I overcome this difficulty by placing, between the discharge end of the screw conveyor and the extruding head carrying the die, a positively acting feeding means having practically no slippage, so that the pressure imparted to the plastic material in the extruding head may be made practically anything desired. This feeding means is mounted in a housing 27 secured to the cylinder 11 by any suitable means, such as bolts 28, this housing being bored to receive a cylindrical casing 29, a flange 30 being provided at one end of the housing to retain the casing therein. The feeding means comprises a pair of rotating elements 31 and 32 having intermeshing ribs or projections similar to the teeth of spur gears, and, as these elements are similar to gears, I have called them such throughout the specification and claims for ease and brevity. I prefer, however, not to use true gears, but to form the teeth or projections so that at no time during their movements to or from intermeshing position will there be any passage between them. Under some conditions, true gears will act satisfactorily. Of these elements 31 is the driving element and 32 the driven element, the casing being chambered with the end walls thereof 33 formed on the arc of a circle of substantially the same diameter as the outside diameter of the elements, so that they may be mounted to rotate with the outer surfaces of their teeth closely adjacent the curved surfaces 33. It will be noted from an inspection of Fig. 5 that the general outline of the chamber in the casing is oblong with the walls 33 forming the opposite ends thereof and substantially semicylindrical with the gear elements rotating closely adjacent thereto, and the side walls between these walls 33 being curved outwardly somewhat, as indicated at 39, thus providing inlet and outlet spaces on opposite sides of the intermeshing teeth of the gear elements. The casing 29 has an end wall 34 provided with a series of openings therein, one of these openings 35 forming a bearing for the projecting bearing stud 36 on the driving element 31, a second opening 37 adapted to receive one end of the bearing stud 38 for the driven element 32, and an inlet opening 39 to allow admission of the plastic covering material from the delivery end of the screw conveyor to the space in the chamber of the casing at one side of the rotating elements, in the arrangement shown above them, but the device will obviously operate just as effectively if it is arranged below or at one side of the gear elements. The other end of the chamber is closed by a cap 40 provided with a projecting stud 41 adapted to extend into a recess 42 in the driving element 31 and form a second bearing therefor. This cap is also provided with a threaded opening 43 for the bearing stud 38 which has a threaded portion 44 to fit the threaded opening in the cap, and is provided with a transverse slot 45 in the head thereof to facilitate insertion and removal. The cap is secured in position in the casing by means of the nut 46 threaded into the casing, this arrangement securely fastening the gear elements within the casing. The cap 40 is also provided with an outlet opening 47 leading from the space in the chamber of the casing on the opposite side of the gear elements from the space to which the inlet opening 39 leads, in the present arrangement below them, to allow the plastic material carried from the space in the chamber to which inlet 39 leads to this space under the action of the gear elements, to pass from this space to the chamber 23 in the covering or extruding head, as the case may be, the inlet to this chamber being placed at the open end of the casing, as shown in Fig. 3. The insulating or extruding head 22 is secured to the housing 27 by any suitable means, such as bolts 48. The casing 29 is preferably cylindrical and is prevented from turning within the housing by any suitable means, such as a key 49. The cap 40 is also prevented from turning in the casing by means of a key 50, and the nut 46 has a noncircular opening 51 therethrough to facilitate insertion and removal of the nut and also to provide a passage for the plastic material from the gear elements to the chamber 23.

The gear elements are driven from the spiral conveyor 13 by means of a coupling 52 provided with transverse ribs 53 on opposite sides thereof and set at right angles to each other, one of these ribs fitting a groove in the end of the conveyor and the other fitting a similar groove in the end of a coupling sleeve 54. This arrangement obviates the necessity of accurately positioning the axis of the driven element with respect to the axis of the screw conveyor as it will operate when they are somewhat out of alignment. The sleeve is also provided with a noncircular socket leading from the other end thereof, this socket being preferably square to receive the squared end 55 on the end of the stud 36 of the driving gear element 31.

In operation, the plastic material is fed to the spiral conveyor through the feeding opening 14 and may be supplied either in chunks or in a strip, as desired. This material is conveyed along the cylinder 11 by the action of the conveyor to the closed end 34 of the casing 29, and during this traveling movement may be cooled or heated by fluid in the chambers 16 to produce the proper consistency therefor. This material is forced by the conveyor through the inlet opening 39 to the space in the casing 29 at one side of the gear elements and into the grooves between the teeth. As the elements rotate in the direction indicated by the arrows in Fig. 5, this material is carried around in these grooves between the same and the curved walls 33 to the space in the chamber on the opposite side of the intermeshing portions of the gear elements where it is forced from the grooves between the teeth by the intermeshing of these teeth, and as the only outlet from the space on this side of the gears is the outlet opening 47 it is also forced through this outlet opening 47 to the chamber 23 and through the die 24 at a high pressure. The action of this covering material passing through the die about the wire draws this wire through the die and covers the same, no separate feeding means for the wire being necessary, suitable reels for supporting the wire, not shown, being provided. It will be noted that, through the use of the gear elements 31 and 32, there is practically no slippage of the material in the feeding operation through these elements, and the pressure in the chamber 23 may be practically anything desired, and the speed of operation and the output may, therefore, be greatly increased over that of the old machine employing the screw conveyor only as the feeding means. The same will be true when the device is used for other extruding operations such, for example, as forming tubes or straining plastic material.

Having thus set forth the nature of my invention, what I claim is:

1. An extruding machine comprising a cylinder, a screw conveyor in said cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising a casing and intermeshing gear elements mounted to rotate in said casing and closely fitting the walls thereof, an extruding die arranged to receive the plastic material from the feeding mechanism, and means for rotating the gear elements.

2. An extruding machine comprising a cylinder, a screw conveyor in said cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising a casing and intermeshing gear elements mounted to rotate in said casing and closely fitting the walls thereof, said gear elements being arranged to receive the plastic material from the screw conveyor longitudinally of the teeth from the end thereof, an extruding die arranged to receive the plastic material from the feeding mechanism, and means for rotating the gear elements.

3. An extruding machine comprising a cylinder, a screw conveyor in said cylinder and of substantially the same diameter as said cylinder so that said conveyor is adapted to convey plastic material and discharge it from the cylinder under pressure, a positively acting feeding mechanism connected with said cylinder to receive the plastic material therefrom, said feeding mechanism comprising a casing and intermeshing gear elements mounted to rotate in said casing and closely fitting the walls thereof, an extruding die arranged to receive the plastic material from the feeding mechanism, means for rotating the screw conveyor, and a driving connection from the discharge end of said screw conveyor to one of said gear elements.

4. An extruding machine comprising a cylinder, a screw conveyor for plastic material in said cylinder of substantially the same diameter as the cylinder so that said conveyor is adapted to convey plastic material and discharge it from the cylinder under pressure, a housing secured to the discharge end of the cylinder, an extruding die secured to the housing, positively acting means in the housing arranged to receive the material from the screw conveyor and force it into the die comprising a removable, chambered casing in the housing, a pair of intermeshing spur gear elements in the casing and mounted to rotate in close proximity to opposite side walls of the chamber, and a driving connection from the outlet end of the screw conveyor to one of said elements.

5. In an extruding machine a feeding device for plastic material comprising a chambered casing, rotatable intermeshing gear elements in said casing, and means for rotating one of said elements, said casing being provided with inlet and outlet openings to the chamber therein on opposite sides, respectively, of the intermeshing portions of said elements and extending in a direction longitudinally of the axes of rotation of said elements.

6. In an extruding machine a feeding device for plastic material comprising a casing having an oblong chamber with the end walls thereof being substantially semicylindrical, and intermeshing gear elements mounted to rotate in said chamber closely adjacent the semicylindrical end walls, said casing being provided with an inlet opening and an outlet opening on opposite sides of the intermeshing portions of the gear elements and located at the ends of said elements.

7. An extruding machine comprising a cylinder, a screw conveyor for plastic material in said cylinder of substantially the same diameter as the cylinder so that said conveyor is adapted to convey plastic material and discharge it from the cylinder under pressure, a housing secured to the cylinder at the outlet end of the conveyor, an extruding die secured to the housing on the other side thereof from the cylinder, positively acting feeding means in the housing comprising rotatably mounted intermeshing gear elements closely fitting the walls of the housing, said housing being provided with an inlet opening from the cylinder to one side of the intermeshing portions of said gear elements and an outlet opening to the die from the other side of said intermeshing portions, and means for rotating the gear elements.

8. An extruding machine comprising a cylinder, a screw conveyor for plastic material in said cylinder of substantially the same diameter as the cylinder so that said conveyor is adapted to convey plastic material and discharge it from the cylinder under pressure, a housing secured to the cylinder at the outlet end of the conveyor, an extruding die secured to the housing on the other side thereof from the cylinder, positively acting feeding means in the housing comprising rotatably mounted intermeshing gear elements closely fitting the walls of the housing and arranged with their axes substantially parallel with the axis of the screw conveyor, said housing being provided with an inlet opening from the outlet end of the cylinder to one end of the gear elements on one side of the intermeshing portions of said elements and an outlet opening to the die from the other ends of the gear elements on the other side of said intermeshing portions, and a coupling forming a driving connection from the outlet end of said screw conveyor to one of said gear elements.

In testimony whereof I affix my signature.

EDGAR H. JOHNSON.